(12) United States Patent
Hayward et al.

(10) Patent No.: US 7,250,756 B1
(45) Date of Patent: Jul. 31, 2007

(54) FLEXIBLE SENSOR INPUT ASSEMBLY

(75) Inventors: John S. Hayward, Torrington, CT (US); Thomas R. Bober, Amston, CT (US); Jerzy Baginski, Wethersfield, CT (US); Walter P. Waskiewicz, Torrington, CT (US); Daniel R. McLarty, Burlington, CT (US)

(73) Assignee: Timken US Corporation, Torrington, CT (US)

( * ) Notice: Subject to any disclaimer, the term of this patent is extended or adjusted under 35 U.S.C. 154(b) by 0 days.

(21) Appl. No.: 11/350,506

(22) Filed: Feb. 9, 2006

(51) Int. Cl.
*G01B 7/30* (2006.01)
(52) U.S. Cl. .................. 324/207.25; 324/261
(58) Field of Classification Search ................
324/207.2–207.25, 260–262
See application file for complete search history.

(56) References Cited

U.S. PATENT DOCUMENTS

| 4,337,399 | A | | 6/1982 | Nakamura et al. |
| 4,433,795 | A | | 2/1984 | Maiefski et al. |
| 5,737,994 | A | | 4/1998 | Escobosa |
| 5,777,471 | A | * | 7/1998 | Stoll et al. ............. 324/207.25 |
| 6,007,250 | A | * | 12/1999 | Brauer et al. ................ 384/448 |
| 6,016,286 | A | | 1/2000 | Olivier et al. |
| 6,027,250 | A | | 2/2000 | Reubelt et al. |
| 6,322,324 | B1 | | 11/2001 | Kennedy et al. |
| 6,453,669 | B2 | | 9/2002 | Kennedy et al. |
| 6,541,962 | B1 | * | 4/2003 | Borgmann et al. ..... 324/207.17 |
| 6,848,888 | B2 | | 2/2005 | Du et al. |
| 2002/0114704 | A1 | | 8/2002 | Terauchi |
| 2004/0060371 | A1 | | 4/2004 | Barkhoudarian |
| 2005/0058551 | A1 | | 3/2005 | Wakita et al. |

OTHER PUBLICATIONS

Admitted Prior Art Sauer-Danfoss Sensor Input Assembly, pp. 1-2.

* cited by examiner

*Primary Examiner*—Jay M. Patidar
(74) *Attorney, Agent, or Firm*—Michael Best & Friedrich LLP

(57) ABSTRACT

A sensor assembly for determining rotational angular displacement of a first moving component in a machine relative to a second component in the machine includes a base, a magnet housing, and a flexible member. The base is configured to be rigidly secured to the first moving component for movement therewith. The base defines a first axis of rotation. The magnet housing supports a sensor magnet and is rotatably received in the second component. The magnet housing defines a second axis of rotation. The flexible member has a first end rigidly secured to the magnet housing coaxially with the first axis of rotation. A second end of the flexible member is rigidly secured to the magnet housing coaxially with the second axis of rotation. A flexible body portion of the flexible member is capable of accommodating misalignment between the first and second axes of rotation.

20 Claims, 4 Drawing Sheets

FLEXIBLE SENSOR INPUT ASSEMBLY

BACKGROUND

The present invention relates to a device for measuring oscillatory or rotational angular displacement of one component in a machine relative to another component, the second component being stationary, oscillating, or rotating at a different rate and/or direction with respect to the first component.

In a machine with moving parts, oftentimes a component in the machine moves, rotates, or oscillates at a different rate than another component in the same machine. It is often desirable to measure the oscillatory or rotational angular displacement between the two components. A device can be installed between two parts of a machine to measure this displacement. The device has two ends; a first end coupled to a moving component of a machine and a second end coupled to a moving or stationary component of a machine that includes a portion of a measurement system to measure oscillation or rotational angular displacement of the first moving component. The two ends are connected to one another by a rigid member. In many cases, the measurement device is installed after the machine has been assembled and can be coupled to pre-existing attachment fixtures on the machine. Because the measurement device is typically installed after assembly of the machine, the attachment fixtures should be aligned such that the measurement device fits correctly within the machine. However, if tolerances of the machine parts or the attachment fixtures are such that proper alignment does not exist, the measurement device either cannot be installed, or if installation is possible, accurate and reliable measurement of the movement of a moving component with respect to another component is compromised, or the assembly is bent or fractured.

SUMMARY

The device of the present invention achieves accurate and reliable determination of the oscillatory or rotational angular displacement of a first component in a machine with respect to another component in the machine. The device is able to be installed between two components of a machine even if the pre-existing attachment fixtures or locations are misaligned.

In one embodiment, the invention provides a sensor assembly for determining rotational angular displacement of a first moving component in a machine relative to a second component in the machine. The sensor assembly includes a base, a magnet housing, and a flexible member. The base is configured to be rigidly secured to the first moving component for movement therewith. The base defines a first axis of rotation. The magnet housing supports a sensor magnet and is rotatably received in the second component. The magnet housing defines a second axis of rotation. The flexible member has a first end rigidly secured to the magnet housing coaxially with the first axis of rotation. A second end of the flexible member is rigidly secured to the magnet housing coaxially with the second axis of rotation. A flexible body portion of the flexible member is capable of accommodating misalignment between the first and second axes of rotation.

In another embodiment the invention provides an assembly including a stationary housing, a swashplate movable relative to the stationary housing, and a sensor assembly for determining rotational angular displacement of the swashplate relative to the stationary housing. The sensor assembly includes a base rigidly secured to the swashplate for movement therewith. The base defines a first axis of rotation. A magnet housing supporting a sensor magnet and being rotatably received in the stationary housing. The magnet housing defines a second axis of rotation. A flexible member has a first end rigidly secured to the base coaxially with the first axis of rotation, a second end rigidly secured to the magnet housing coaxially with the second axis of rotation, and a flexible body portion capable of accommodating misalignment between the first and second axes of rotation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
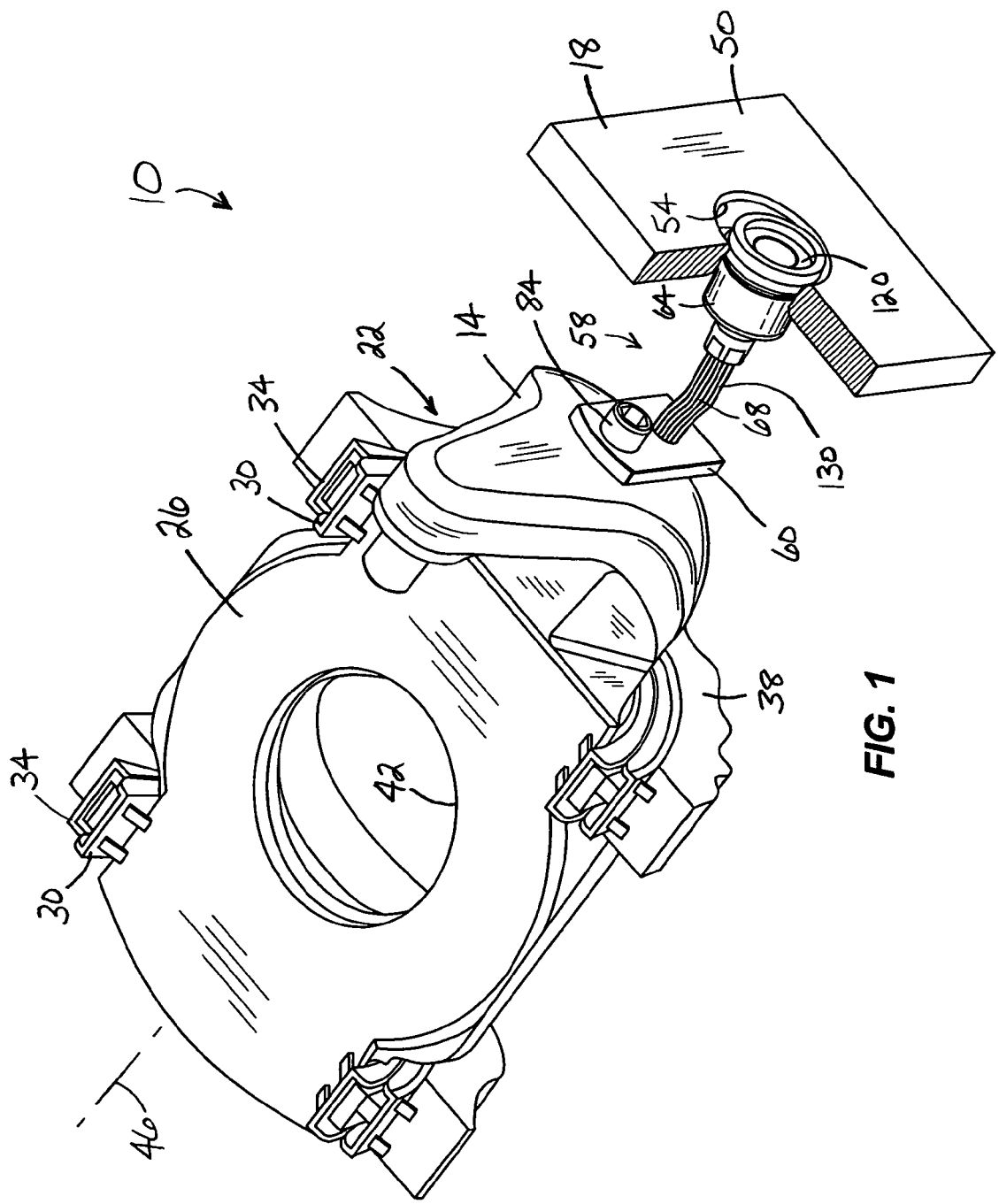
FIG. 1 is a perspective view of a measurement device of the present invention located in a portion of a machine whose components are to be measured.

FIG. 1 illustrates a portion of a pump, compressor, or other machine 10 having a first movable component 14 and a second stationary or movable component 18. In the illustrated embodiment, the machine is a variable displacement pump having a swashplate assembly 22. The swashplate assembly 22 includes a swashplate 26 coupled to at least one inner race member 30. Each inner race member 30 is positioned adjacent a respective outer race member 34. Rolling elements (not shown) are located between each inner race member 30 and outer race member 34 to allow the inner race member 30 to move with respect to the outer race member 34. The outer race member 34 is coupled to a bearing saddle, or cradle, 38 that is stationary. The swashplate assembly 22 also has a radially centered opening 42 for passage of a rotatable shaft (not shown). In operation, the swashplate 26 oscillates back and forth in the cradle 38 about an axis 46. The illustrated swashplate 26 can oscillate in the cradle 38 to each side of the axis 46 by about 20 to 25 degrees, however, the oscillation angle can vary as desired. The swashplate 26 is driving or being driven by pistons (not shown) reciprocating in a rotating cylinder block (not shown) of a fluid machine, as is understood to those skilled in the art.

Figure 4:
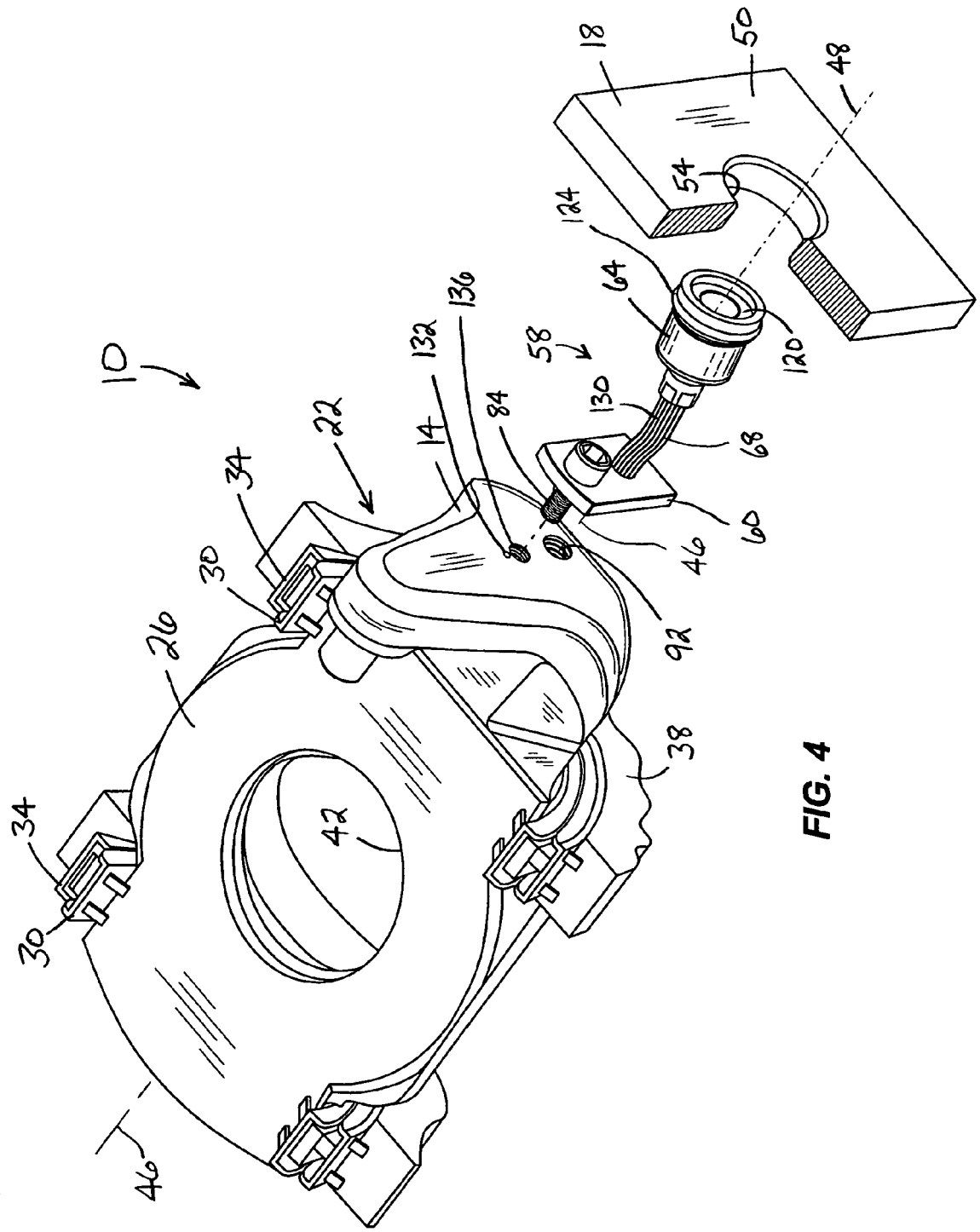
FIG. 4 is an exploded view of the machine and measurement device shown in FIG. 1.

In the illustrated embodiment, the second stationary or movable component 18 is a stationary wall 50. The stationary wall 50 includes a bore 54 extending partially or entirely through the stationary wall 50. The bore defines an axis 48 (see FIG. 4). A sensor (not shown) is attached to the stationary wall 50 to communicate with the bore 54, and is operable to send signals to a processor, as will be described in more detail below.

Figure 2:
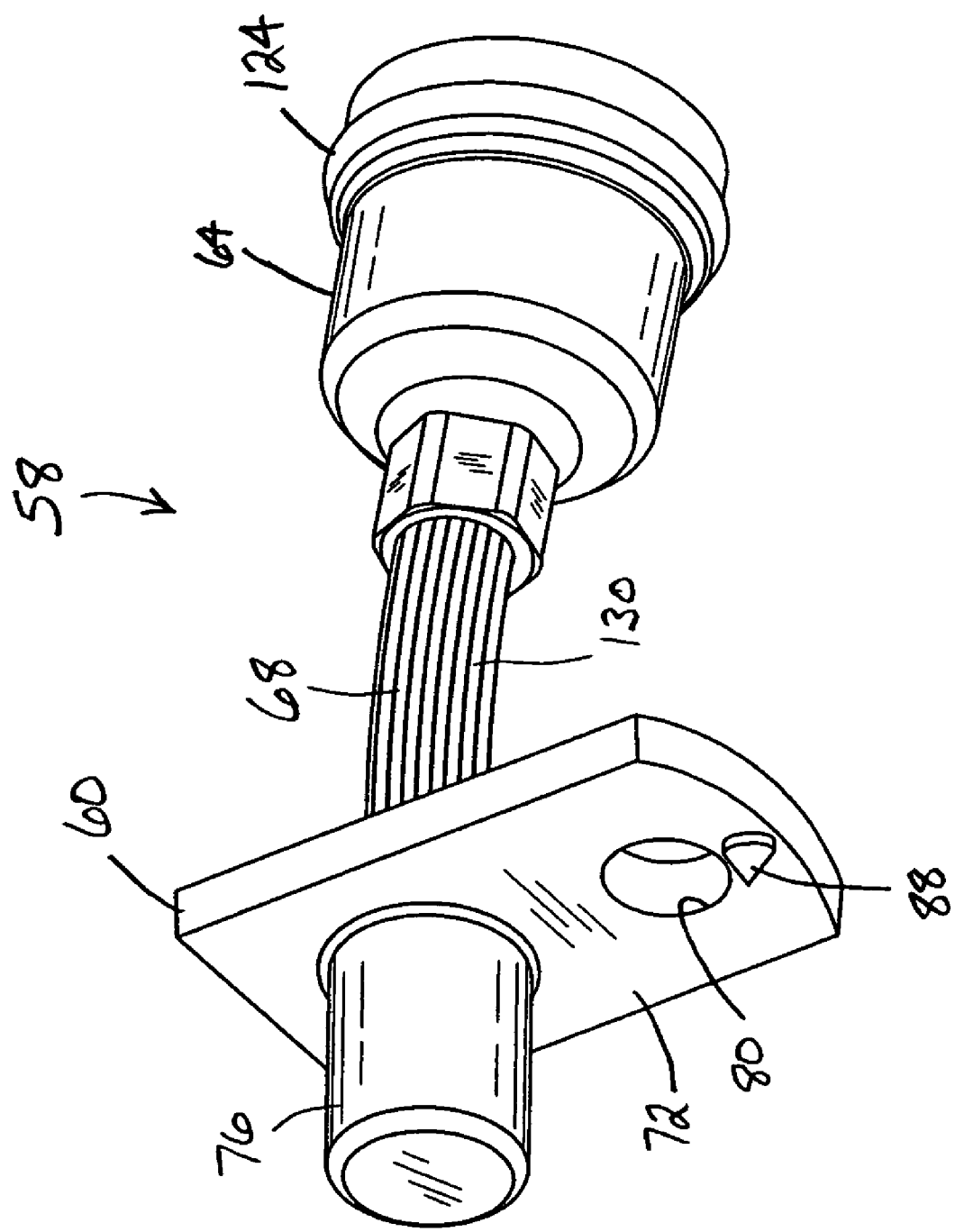
FIG. 2 is a perspective view of the measurement device shown in FIG. 1.
Figure 3:
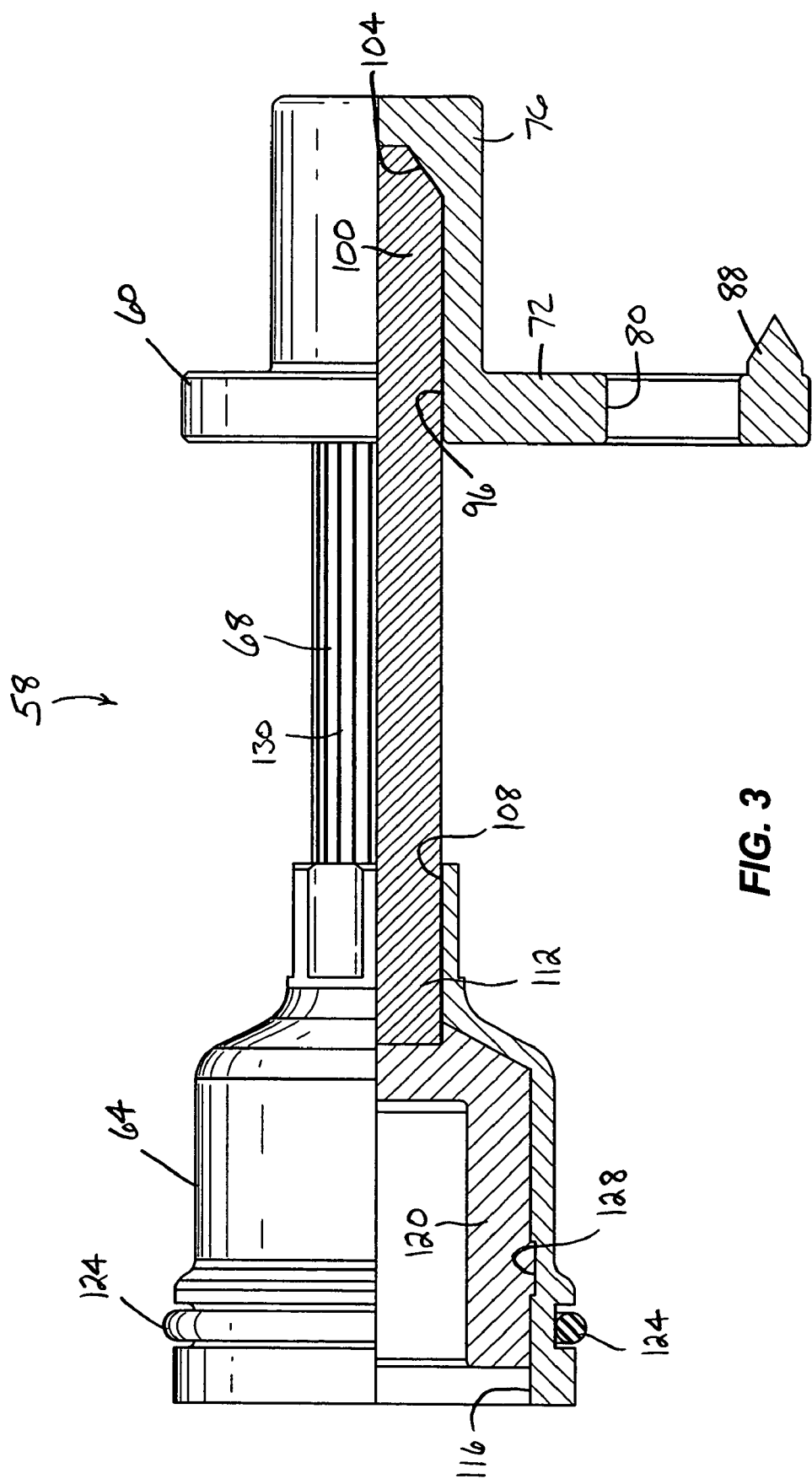
FIG. 3 is a partial cross-section view of the measurement device of FIG. 2.

FIG. 1 also illustrates a measurement device, or flexible sensor input assembly 58 of the present invention. The flexible sensor input assembly 58 includes a base 60, a sensor magnet housing 64, and a flexible axial connecting member, or flexible member 68 interconnecting the base 60 and the sensor magnet housing 64. As illustrated in FIGS. 2 and 3, the base 60 of the flexible sensor input assembly 58 includes a body portion 72, that in the illustrated embodiment has a generally plate-like configuration, and a projecting portion 76, that in the illustrated embodiment has a generally cylindrical configuration. The body portion 72 includes an aperture 80 extending therethrough to facilitate mounting the body portion 72 to the swashplate 26 with a fastener 84 (e.g., a screw—see FIGS. 1 and 2), as will be described below. A protrusion 88 extends from the body portion 72 adjacent the aperture 80 for aligning the body portion 72 with respect to the swashplate assembly 22 during installation.

The projecting portion 76 is sized and configured to be received in a receiving aperture 92 (see FIG. 4) in the swashplate assembly 22. The receiving aperture 92 is substantially coaxial with the axis 46 about which the swashplate 26 oscillates so that oscillation of the swashplate 26 causes rotation of the projecting portion 76 of the base 60 about the axis 46 when the projecting portion 76 is received in the aperture 92. As shown in FIG. 3, the projecting portion 76 also defines a receiving aperture 96 for receiving one end 100 of the flexible member 68. The receiving aperture 96 has a beveled end 104 that aids in locating the end 100 of the flexible member 68 axially. In other embodiments, the aperture 96 can have an alternative end geometry such as rounded, ovoid, cylindrical, conical, or the like.

The base 60 is made of a suitable polymer or a metallic material. In the illustrated embodiment, the base 60 is a polymer that is molded about the flexible member 68. In other embodiments, the base 60 can be mechanically fixed to the flexible member 68 by any suitable means.

With continued reference to FIG. 3, the sensor magnet housing 64 includes an aperture 108 for receiving the second end 112 of the flexible member 68. The sensor magnet housing 64 can be crimped or otherwise mechanically deformed to retain the second end 112 of the flexible member 68. Other mechanical securing means can also be employed.

The sensor magnet housing 64 also includes a bore 116 that receives and supports a sensor magnet 120. In the illustrated embodiment, the sensor magnet 120 is molded into the bore 116 in the sensor magnet housing 64. The sensor magnet 120 is magnetized after final and complete assembly of the flexible sensor input assembly 58. Magnetization after final and complete assembly of the flexible sensor input assembly 58 establishes a closed polar magnetic field in a fixed angular relation to the base 60, and eliminates angular inaccuracies due to a tolerance stack-ups. The tolerance stack-ups can occur if the sensor magnet 120 was magnetized prior to assembly into the sensor magnet housing 64, or if the magnetization occurred prior to final and complete assembly of the flexible sensor input assembly 58. The sensor magnet housing 64 can be ferrous, or of any other composition such that the sensor magnet housing 64 aids in the formation of a closed polar magnetic field of sufficient strength to allow accurate measurement of minute angular displacements. An O-ring 124 around the outer circumference of the sensor magnet housing 64 helps to create a seal between the sensor magnet housing 64 and the bore 54 of the stationary wall 50 into which the sensor magnet housing 64 is inserted.

The sensor magnet housing 64 incorporates axial and radial features to provide permanent axial retention and rotational registration of the sensor magnet 120 relative to the sensor magnet housing 64 and the base 60. For example, as shown in FIG. 3, a circumferential groove 128 in the bore 116 of the magnet housing 64 helps to retain and register the sensor magnet 120 with respect to the sensor magnet housing 64. The crimped connection between the sensor magnet housing 64 and the flexible member 68 maintains the relative position of the flexible member 68 in relation to the sensor magnet housing 64 and the sensor magnet 120.

The flexible member 68 can be made of any strong flexible material such as a polymer, a woven metallic material, or a braided metallic material. As mentioned above, the material of the flexible member 68 can be chosen to facilitate molding the base 60 around the flexible member 68. Due to the fixed mechanical connection with each of the base 60 and the sensor magnet housing 64, the flexible member 68 transmits the rotation of the projecting portion 76 caused by oscillation of the swashplate assembly 22 to the sensor magnet housing 64. Rotation of the sensor magnet housing 64 is sensed by the sensor attached to the stationary wall 50, and a signal indicative of the angular position of the swashplate assembly 22 can be relayed to the processor.

The body portion 130 of the flexible member 68 is generally straight when at rest, but should be able to bend and flex when a force is applied to the flexible member 68. The bending flexibility of the flexible member 68 permits the base 60 and the sensor magnet housing 64 to rotate about different axes 46, 48 (see FIG. 4) to compensate for misalignment between the bore 54 in the stationary wall 50 and the receiving aperture 92 in the swashplate assembly 22. In other words, when the bore 54 in the stationary wall 50 and the receiving aperture 92 in the swashplate assembly 22 are not coaxial, the flexibility of the flexible member 68 enables the flexible sensor input assembly 58 to be installed and to accurately measure the angular displacement of the swashplate assembly 22 despite the misalignment of the machine components 14, 18. This arrangement allows for larger tolerances between the components of the machine. In the embodiment illustrated in FIGS. 1–4, the flexible member 68 of the flexible sensor input assembly 58 can generally bend to accommodate misalignment of up to about 0.25 inches between the swashplate 26 and the stationary wall 50.

Installation of the assembled flexible sensor input assembly 58 to the machine 10 will now be discussed. The sensor magnet housing 64 is inserted into the bore 54 of the stationary wall 50, which is sized such that a slip-fit is created between the sensor magnet housing 64 and the stationary wall 50. The slip-fit allows the sensor magnet housing 64 to rotate about the axis 48 within the bore 54, but will not allow the sensor magnet housing 64 to slip out of the bore 54 or change its axis of rotation within the bore 54. The sensor attached to the stationary wall 50 cooperates with the sensor magnet 120 located inside of the sensor magnet housing 64 to generate a signal representative of the relative angular displacement of the swashplate assembly 22. The O-ring 124 around the sensor magnet housing 64 seals the flexible sensor input assembly 58 to the stationary wall 50, but allows for rotation of the sensor magnet housing 64 within the bore 54.

The protruding portion 76 of the base 60 is inserted into the receiving aperture 92 in the swashplate assembly 22 and the protrusion 88 on the body portion 72 of the base 60 is inserted into a locating hole 132 (see FIG. 4) in the swashplate assembly 22. The aperture 80 through the body portion 72 of the base 60 will be aligned with a threaded aperture 136 (see FIG. 4) in the swashplate assembly 22 such that the fastener 84 can be inserted through the aperture 80 in the body portion 72 and into the threaded aperture 136 in the swashplate assembly 22, thereby securing the base 60 to the swashplate assembly 22 and preventing relative motion between the swashplate assembly 22 and the base 60. The combination of the fastener 84, the protrusion 88, and the locating hole 132 will aid in establishing and maintaining angular registration between the swashplate 26 and the base 60 to a high degree of accuracy. In other embodiments, other methods (e.g., rivets, pins, posts, clips, clamps, inter-engaging elements, or any combination of such elements) for registering and fixing the flexible sensor input assembly 58 relative to the swashplate assembly 22 can be substituted.

In the event that the bore 54 of the stationary wall 50 is not properly aligned with the receiving aperture 92 in the swashplate 26 due to tolerance stack-ups or other reasons, the flexible member 68 will bend or deflect to accommodate the misalignment of the axes 46, 48, and to properly position the base 60 and the sensor magnet housing 64 relative to one another. This enables installation to be completed, while maintaining the accuracy of the measuring capabilities of the flexible sensor input assembly 58.

In operation, as the swashplate 26 oscillates, the base 60 of the flexible sensor input assembly 58 oscillates with the swashplate 26 due to the fixed connection between the swashplate 26 and the base 60. The protruding portion 76 rotates about the axis 46. As the protruding portion rotates, the flexible member 68 transfers rotational motion to the sensor magnet housing 64 to cause the sensor magnet housing 64 to rotate within the bore 54 of the stationary wall 50 about the axis 48. The sensor located at the stationary wall 50 receives information regarding the oscillation of the swashplate 26 from the sensor magnet 120 inside of the sensor magnet housing 64. This information is sent to the processor to determine the oscillation angle of the swashplate 26. In some embodiments, the magnet and the processor may be able to calculate the amount of oscillation using the velocity of the sensor magnet 120 and the length of time of rotation. In other embodiments, the speed or acceleration of the swashplate 26 may also be measured.

While the above description describes the use of the flexible input sensor assembly 58 in an oscillating machine application, it is to be understood that the flexible input sensor assembly of the invention can also be used in rotary devices as well.

Various features and advantages of the invention are set forth in the following claims.

What is claimed is:

1. A sensor assembly for determining rotational angular displacement of a first moving component in a machine relative to a second component in the machine, the sensor assembly comprising:
   a base configured to be rigidly secured to the first moving component for movement therewith, the base defining a first axis of rotation;
   a magnet housing supporting a sensor magnet and being rotatably received in the second component, the magnet housing defining a second axis of rotation; and
   a flexible member having a first end rigidly secured to the base coaxially with the first axis of rotation, a second end rigidly secured to the magnet housing coaxially with the second axis of rotation, and a flexible body portion capable of accommodating misalignment between the first and second axes of rotation.

2. The sensor assembly of claim 1, wherein the base includes an aperture for receiving the first end of the flexible member.

3. The sensor assembly of claim 1, wherein the base is molded about the first end of the flexible member.

4. The sensor assembly of claim 1, wherein the base includes a projection configured to be received in an aperture in the first moving component to prevent relative rotation between the base and the first moving component.

5. The sensor assembly of claim 1, wherein the magnet housing includes an aperture for receiving the second end of the flexible member.

6. The sensor assembly of claim 5, wherein the magnet housing is crimped about the second end of the flexible member to secure the second end of the flexible member in the aperture of the magnet housing.

7. The sensor assembly of claim 1, wherein the magnet is molded into the magnet housing.

8. The sensor assembly of claim 1, wherein the magnet is magnetized after assembly of the sensor assembly.

9. The sensor assembly of claim 1, wherein the flexible member can bend to accommodate misalignment of up to about 0.25 inches between the first and second components.

10. An assembly comprising:
    a stationary housing;
    a swashplate movable relative to the stationary housing; and
    a sensor assembly for determining rotational angular displacement of the swashplate relative to the stationary housing, the sensor assembly including,
    a base rigidly secured to the swashplate for movement therewith, the base defining a first axis of rotation;
    a magnet housing supporting a sensor magnet and being rotatably received in the stationary housing, the magnet housing defining a second axis of rotation; and
    a flexible member having a first end rigidly secured to the base coaxially with the first axis of rotation, a second end rigidly secured to the magnet housing coaxially with the second axis of rotation, and a flexible body portion capable of accommodating misalignment between the first and second axes of rotation.

11. The assembly of claim 10, wherein the base includes an aperture for receiving the first end of the flexible member.

12. The assembly of claim 10, wherein the base is molded about the first end of the flexible member.

13. The assembly of claim 10, wherein the base includes a projection configured to be received in an aperture in the swashplate to prevent relative rotation between the base and the swashplate.

14. The assembly of claim 10, wherein the magnet housing includes an aperture for receiving the second end of the flexible member.

15. The assembly of claim 14, wherein the magnet housing is crimped about the second end of the flexible member to secure the second end of the flexible member in the aperture of the magnet housing.

16. The assembly of claim 10, wherein the magnet is molded into the magnet housing.

17. The assembly of claim 10, wherein the magnet is magnetized after assembly of the sensor assembly.

18. The assembly of claim 10, wherein the flexible member can bend to accommodate misalignment of up to about 0.25 inches between the swashplate and the stationary housing.

19. The assembly of claim 10, wherein a slip-fit exists at a connection point between the stationary housing and the magnet housing to allow relative movement between the stationary housing and the magnet housing.

20. The assembly of claim 19, further comprising an O-ring coupled to the magnet housing to provide a seal between the magnet housing and the stationary housing.

* * * * *